March 21, 1939.  F. W. SCHWINN  2,151,533
BICYCLE FRAME
Filed March 3, 1938  2 Sheets-Sheet 1
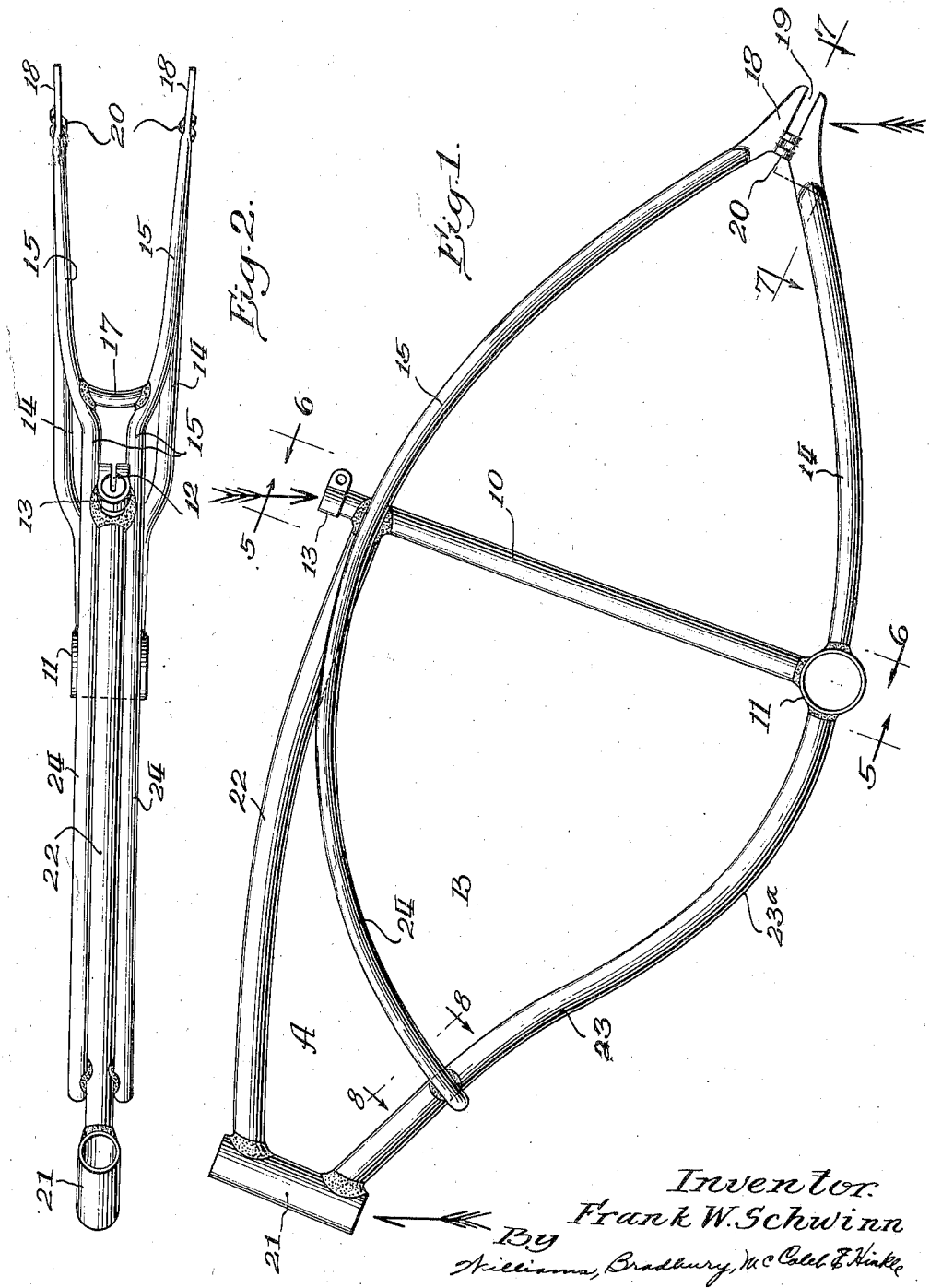
Inventor.
Frank W. Schwinn
By Williams, Bradbury, McCaleb & Hinkle
Attys.

March 21, 1939.  F. W. SCHWINN  2,151,533
BICYCLE FRAME
Filed March 3, 1938  2 Sheets-Sheet 2
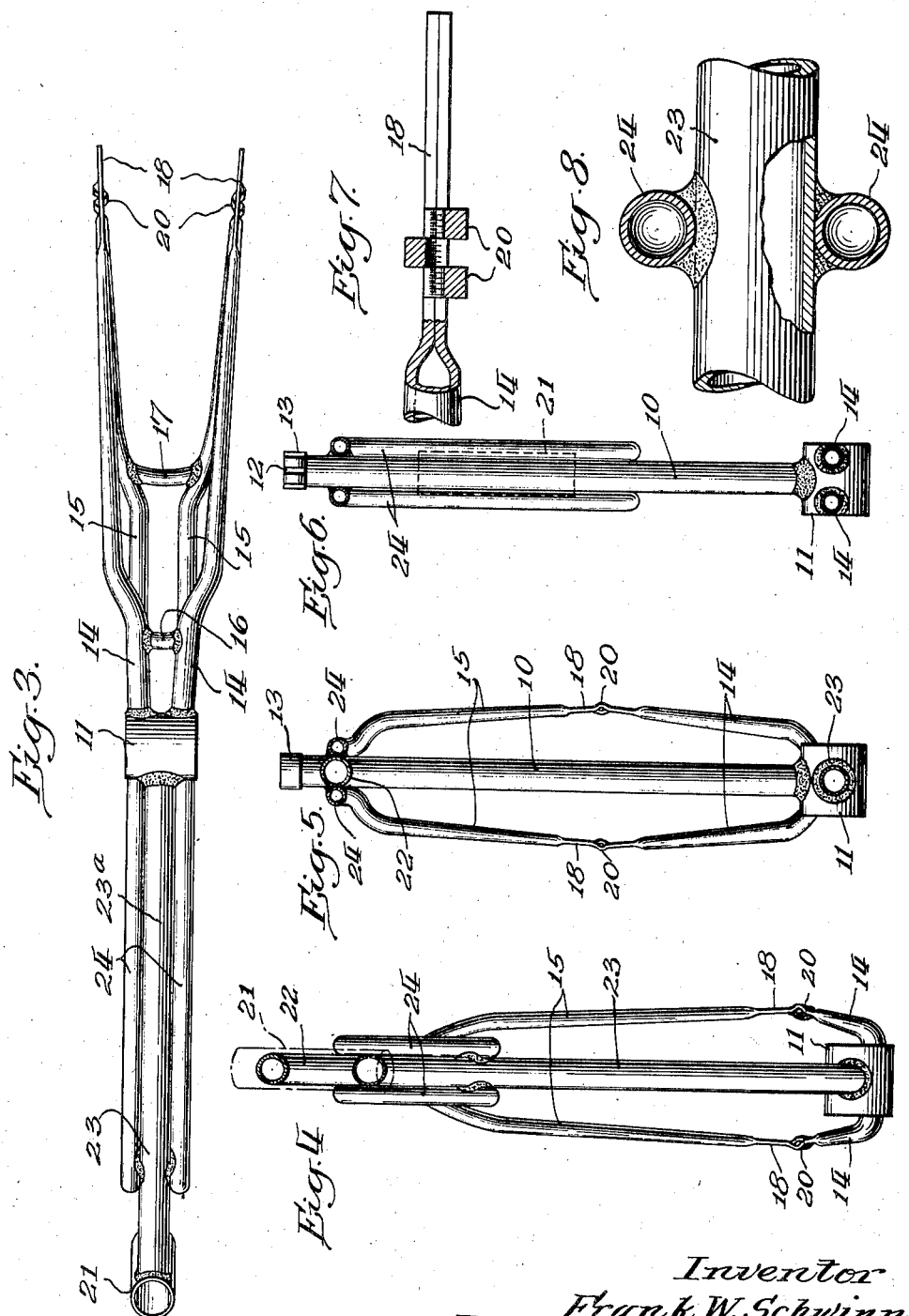
Inventor
Frank W. Schwinn
By Williams, Bradbury, McCaleb & Hinkle
Attys.

Patented Mar. 21, 1939

2,151,533

UNITED STATES PATENT OFFICE 2,151,533

BICYCLE FRAME

Frank W. Schwinn, Chicago, Ill.

Application March 3, 1938, Serial No. 193,677

1 Claim. (Cl. 280—281)

My invention contemplates and provides a bicycle frame of novel and graceful construction which is particularly well adapted to resist certain strains, resultant from accidental or other overloads, which frequently destroy ordinary bicycle frames,—i. e., those strains which tend to twist the axis of the steering head out of the plane which includes the axis of the saddle post mast, and those strains which tend to disrupt the union between the steering head and the reach tube which, in the normal use of the bicycle, constitutes a tension member acting between the steering head and the crank hanger.

The primary object of the invention is to provide a bicycle frame of neat and sturdy appearance which is so constructed as to be well adapted to resist the destructive strains to which reference is made in the preceding paragraph.

A secondary object is to provide a bicycle frame which, as an incident to its being greatly strengthened to resist the aforesaid strains, provides a natural pocket for a battery and/or tool box.

A salient feature of the frame of the present invention is that the upper stays of its rear wheel fork, after being welded to the upper portion of the saddle post mast, are extended and curved forwardly and downwardly in parallelism to the lower reach tube, and are welded to the latter,—in such a way as effectively to resist those strains which tend to twist the axis of the steering head out of the plane of the axis of the saddle post mast.

Another important feature of the invention is that the lower reach tube, to which the extensions of the fork stays are welded as aforesaid, is slightly cambered so that it, and said stay extensions, yieldingly, rather than positively, resist strains which tend to tear the steering head away from the lower reach tube.

These and other features, objects and advantages of the invention will appear from the following detailed description and the accompanying drawings, in which Fig. 1 is a side elevational view of a frame embodying the present invention;

Fig. 2 is a top plan view thereof;

Fig. 3 is a bottom plan view thereof;

Fig. 4 is a front elevational view thereof;

Fig. 5 is a view partly in section and partly in elevation which may be regarded as taken in the plane of the line 5—5 of Fig. 1 and looking in the direction indicated by the arrows;

Fig. 6 is a view partly in section and partly in elevation which may be regarded as taken in the plane of the line 6—6 of Fig. 1 and looking in the direction indicated by the arrows;

Fig. 7 is a fragmentary detail view, partly in section, which may be regarded as taken in the parallel planes of the lines 7—7 of Fig. 1 and looking in the direction indicated by the arrows; and Fig. 8 is a fragmentary detail view, partly in section, which may be regarded as taken in the plane of the line 8—8 of Fig. 1.

Similar characters of reference refer to similar parts throughout the several views. In the drawings welded unions usually are indicated by localized stippling.

The frame illustrated in the drawings comprises the saddle post mast 10, preferably tubular, which at its lower end is welded to a conventional crank hanger 11. The upper end of the mast may be slotted, as indicated at 12, and have welded or otherwise secured thereto a clamp 13 presenting opposed apertured ears for the reception of a bolt whereby a saddle post may be retained at a desired adjustment in and with respect to the mast, as will be well understood by those persons familiar with conventional bicycle construction.

Welded to the crank hanger 11 and extending rearwardly and upwardly therefrom are the lower stays 14 of the fork for the rear wheel of the bicycle of which the frame is to form a part. Welded to diametrically opposite points on the upper portion of the mast 10 and extending rearwardly and downwardly therefrom are the upper stays 15 of the rear wheel fork. Lower stays 14 preferably are welded to the ends of an interposed brace tube 16, and the upper stays 15 are similarly welded to the ends of a generally similar brace tube 17. The rear extremity of each lower stay 14 is connected to the rear end of its corresponding upper stay 15 by means of a connector 18, which may be joined to its associated stays in any suitable manner, e. g., by welding. Each connector 18, in accordance with usual practice, is slotted at 19 for the reception of a rear wheel axle, and is provided with threaded semi-cylindrical loops 20 for cooperation with screws serving as stops to determine the location of the wheel axle in and with respect to slots 19.

The frame comprises a steering head 21 having its upper end welded to the adjacent end of an upper reach tube 22, which has its rear end welded to the upper end of saddle post mast 10. The lower end of steering head 21 is welded to the front end of a lower reach tube 23 having its rear end welded to crank hanger 11, and attention is directed to the fact that lower reach tube is somewhat cambered, as indicated at 23–a.

Attention is now particularly directed to the fact that the upper stays of the rear wheel fork are provided with integral extensions 24 which are curved forwardly and downwardly in parallelism and are welded to lower reach tube 23 at points which, with respect to said lower reach tube, are diametrically opposite and which are somewhat near but definitely spaced from the welded union between steering head 21 and lower reach tube 23. These forward extensions 24 of the upper stays of the rear fork, cooperating as they do with the lower reach tube 23, play an important part in resisting strains which tend to twist the axis of the steering head 21 out of a plane which also includes the axis of saddle post mast 10,—performing this important function without preventing the slightly cambered lower reach tube 23 from resisting, somewhat yieldingly, rather than positively, longitudinal strains, or the longitudinal components of strains, tending to tear the lower end of steering head 21 forwardly away from lower reach tube 23.

The general directions of the forces which act upon the frame when it is normally loaded are indicated by the feathered arrows in Fig. 1,— the two barb feathered arrow representing the downwardly directed force exerted by the weight of the rider, and the single barb feathered arrows representing the upwardly directed reactive forces exerted upon the steering head 21 and rear fork connectors 18. Therefore, in the normal use of the bicycle, the upper stays 15 of the rear fork, the upper reach tube 22 and saddle post mast 10, act as compression members of the frame, whereas the lower stays 14 of the rear fork, the lower reach tube 23 and the forward extensions 24 of the upper fork stays, act as tension members of the frame.

It will be noted that the stay extensions 24 cooperate with upper reach tube 22, steering head 21 and the forward portion of lower reach tube 23 to define the smaller of two very roughly triangular sub-structures of the frame,—i. e., the roughly triangular sub-structure A included within the larger roughly triangular sub-structure B defined by saddle post mast 10, hanger 11, lower reach tube 23, steering head 21, and upper reach tube 22. By virtue of this arrangement of generally triangular sub-structures of the frame, one located within the other, side twisting of the steering head, under overloads accidental or otherwise, is effectively resisted. Moreover, since the parallel spaced-apart stay extensions 24 are welded to diametrically opposite points, on lower reach tube 23, not far removed from the lower end of steering head 21, they materially increase the resistance which is opposed to strains tending to effect side twisting of the steering head.

In the use of the bicycle of which the frame 5 forms a part, the generally upwardly directed force exerted on the steering head 21 by its associated front fork structure comprises a forwardly directed component which at certain times, under overload accidental or otherwise, may become very great. Therefore, the lower reach tube or tension member 23 has been slightly cambered at 23—a, as previously explained, so that it may slightly elongate, if necessary, yieldingly to resist disruption of its union with the steering head 21. In this circumstance the stay extensions 24, being slightly curved from the upper portion of saddle post mast 10 to their points of connection with lower reach tube 23, will themselves yield, i. e., become somewhat slightly straightened or slightly elongated under a severe overload strain tending to disrupt the welded union of steering head 21 and lower reach tube 23. If the stay portions 24 extended in straight lines between their points of connection with the saddle post mast and lower reach tube respectively, the camber of the lower reach tube would be of little or no avail.

Incidentally, the space afforded between the several frame members which define the frame sub-structure A is a very satisfactory place to mount a battery and/or tool box.

Having thus illustrated and described my invention, what I claim is new and desire to secure by Letters Patent of the United States is:

A bicycle frame comprising in combination a steering head, a saddle post mast, a crank hanger attached to the lower end of the saddle post mast, an upper reach tube directly and rigidly connecting the steering head with the upper portion of the saddle post mast, a lower reach tube connecting the steering head with the crank hanger, a pair of lower fork members extending rearwardly from the crank hanger, a pair of upper fork members having their rear ends connected with the rear ends of the lower fork members and extending alongside, embracing between them, and being attached to, the upper portion of the saddle post mast, and integral extensions of said upper fork members extending forwardly and downwardly from the upper portion of the saddle post mast and being attached to a portion of the lower reach tube which is closer to the steering head than to the crank hanger, the rear portions of such integral extensions lying alongside of but not being connected with the rear portion of the upper reach tube.

FRANK W. SCHWINN.